United States Patent [19]

Baker

[11] 4,342,404

[45] Aug. 3, 1982

[54] AUTOMATIC CAN END TRANSFER DEVICE

[75] Inventor: Harry T. Baker, Ancaster, Canada

[73] Assignee: American Can Company, Greenwich, Conn.

[21] Appl. No.: 169,373

[22] Filed: Jul. 16, 1980

Related U.S. Application Data

[63] Continuation-in-part of Ser. No. 66,246, Aug. 13, 1979, abandoned.

[51] Int. Cl.$^3$ .............................................. B65G 57/06
[52] U.S. Cl. ......................................... 221/10; 414/53
[58] Field of Search ................... 221/10, 11, 175, 251, 221/12, 92, 106; 198/160; 414/51, 53

[56] References Cited

U.S. PATENT DOCUMENTS 3,477,591  11/1969  Andersson ......................... 414/53 X
3,674,160   7/1972  Gutowski .......................... 221/10 X Primary Examiner—Stanley H. Tollberg
Attorney, Agent, or Firm—Paul R. Audet; Stuart S. Bowie; William C. Hosford

[57] ABSTRACT

A can end conveying device for conveying ends from a first press to a second press. The conveyor has an input end and a divertor downstream therefrom. Ends are conveyed along a first track to a stacking station which feeds the ends through a first conduit in a block and then through a gate and onto the track for the second press. When the supply of ends from the first press terminates or falls below the demand of the second press, the gate is shifted and ends are fed by an operator onto a manual feeding track for the second press. When the supply of ends from the first press exceeds the demand of the second press, the divertor is activated by a sensor on the stack and diverts the ends from the first track to a second track leading to a manual bagging station. A novel gate structure is disclosed which facilitates jam free operation of the device.

9 Claims, 4 Drawing Figures

AUTOMATIC CAN END TRANSFER DEVICE

BACKGROUND OF THE INVENTION

This is a continuation-in-part of my copending application of the same title, Ser. No. 066246 filed Aug. 13, 1979, now abandoned.

The present invention relates to an apparatus for automatically transferring work pieces from a first station to a second station.

The invention is illustrated in the embodiment of a machine for transferring can ends from a first press to a second press.

In the prior art pertaining to can making, can ends have been manually transferred for years. More recently, Fleetwood Systems, Inc. has developed apparatus for accomplishing the transfer mechanically. Although the latter constitutes an improvement over manual transfer, it nevertheless requires a relatively high degree of manual operation.

The present invention, by contrast, is designed to operate automatically as long as the first or supply press is delivering can ends at the rate demanded by the second press, or even when the supply from the first press exceeds the demand of the second press. Only when the first press fails to deliver can ends at the rate demanded by the second press does it become necessary for an operator to manually feed can ends to the second press.

Thus, a principal object of this invention is to provide an improved automatic can end feeding mechanism for delivering can ends from a first station to a second station.

Further, it is an object of this invention to provide a transfer apparatus which faciliates continuity of operation in a multi station system.

Finally, it is an object of this invention to provide an efficient means for feeding disc like work pieces to a common conveyor from multiple feed channels.

Other objects and advantages of the present invention will appear from the following description and from the drawings.

SUMMARY OF THE INVENTION

It has now been found that certain of the foregoing and related objects of the invention are readily attained in an apparatus for transferring work pieces from a first station to a second station comprising: a main conveyor, a stacking means, high and low indicator means, a collection station, an auxiliary conveyor, a manual feed conveyor, a gate, means for conveying the work pieces from the gate to the second station, diverting means, and means for moving the gate. The main conveyor is provided with an input end operably associated with the first station and an output end operably associated with the stacking means. The stacking means has a loading end and a discharge end and is provided with high and low indicator means for sensing the levels of work pieces received within the stack. The auxiliary conveyor is joined to the main conveyor at a point lying between the input and output ends thereof and terminates at a collection station for the work pieces. A gate is provided with an opening for the passage of work pieces and is movable from a first position aligned with the discharge end of the stacking means, to a second position aligned with the exit end of the manual feed conveyor. The manual feed conveyor is employed for the transfer of work pieces from the collection station to the gate. Means is provided for conveying the work pieces from the gate opening to the second work station. A diverting means is associated with the main and auxiliary conveyors proximate the point of junction. The diverter means is responsive to a signal from the high indicator means. The diverter means diverts the flow of work pieces from the main conveyor to the auxiliary conveyor when the level of stacked work pieces is above the high indicator means. When the level of stacked work pieces falls below the high indicator means, the diverter means retracts thereby permitting the flow of work pieces to procede along the main conveyor. Moving means is provided for moving the gate in response to signals received from the low indicator means. When the level of stacked work pieces falls below the low indicator means, the gate is moved from the first position to the second station conveying means. When the level of stacked work pieces rises above the low indicator means the gate is moved from the second position to the first thereby interrupting the flow of manually fed work pieces and permitting work pieces to flow from the stacking means.

In the illustrated embodiment the work pieces are can ends and the first and second stations, although not shown, are end presses.

It is desirable that the apparatus further include a means for supplying pressurized air, either from a compressor or a blower, to jets located in the main and auxiliary conveyors. The jets which afford a means for directing the movement of work pieces are responsive to signals from the high indicator means. Where blower air rather than compressed air is employed, the jets must necessarily be of larger diameter, say two to three times greater.

In the preferred embodiment the apparatus include a gating means for directing the flow of can ends to a common outlet conveyor from multiple input channels. The gating means comprises a junction block, a gate, means for moving the gate and chute means for conveying can ends passing through said gate to the outlet conveyor. The junction block is provided with an inlet side and an outlet side. The input channels enter the block on the inlet side and terminate as exit ports on the outlet side. Proximate termination of the channel direction is sharply curved or otherwise abruptly altered so that can ends passing through the channels in stacked array are fanned apart causing first segments of their rims to be wide by separated while second segments, diametrically opposite the first segments, are in close contact one with the others, as the ends exit through the port. The gate, which is slidably mounted on the outside side of the block, has an abutting face in contact with the outlet side and a remotely disposed free face. The gate is provided with an opening, alignable with the exit ports. The opening defines a knife in the abutting face which has a leading edge and a trailing edge. Means is provided for moving the gate from a first position where the gate is aligned with the first exit port to a second position where the gate is aligned with a second exit port; or for moving the gate from the second position to the first position. In entering the path of the ends, the leading edge of this knife passes between first rim segments of adjacent ends where the rims are widely separated. The trailing edge of the knife enters where the rims are closely spaced. In this way the flow of ends may be smoothly transferred from one input channel to the other without entrapping or jamming an end between the gate and the port.

The gating means is preferably provided with an opening in the gate which is gradually enlarged in passing from the abutting face to the free face to provide relief from the knife edge. It is further preferable that the knife edge be beveled to provide a lead in surface operable against the second rim segments.

The instant apparatus affords a method of interrupting the axial advance of disc-like work pieces in stacked array under conveyance within a conduit having curved sections and straight sections where the conduit has an internal diameter slightly larger than the outside diameter of the work pieces to provide sliding clearance. The method comprises the following steps: (a) selecting a curved section of conduit in which by virtue of the curve, a first peripheral segment of each work piece is spaced from a corresponding peripheral segment of the adjacent work piece to define a gap there between, while corresponding second peripheral segments are close together. This constitutes a fanning of the work pieces. (b) Forming an opening in the conduit in the region of the fanning and (c) interrupting the advance of the work pieces by interposing a knife between adjacent work pieces at the gap and subsequently moving the knife across the path traversed by the work pieces within the conduit to stop the advance of the work pieces without entrapping or jamming a work piece between the knife and the conduit.

DETAILED DESCRIPTION OF THE ILLUSTRATED EMBODIMENT

Figure 1:
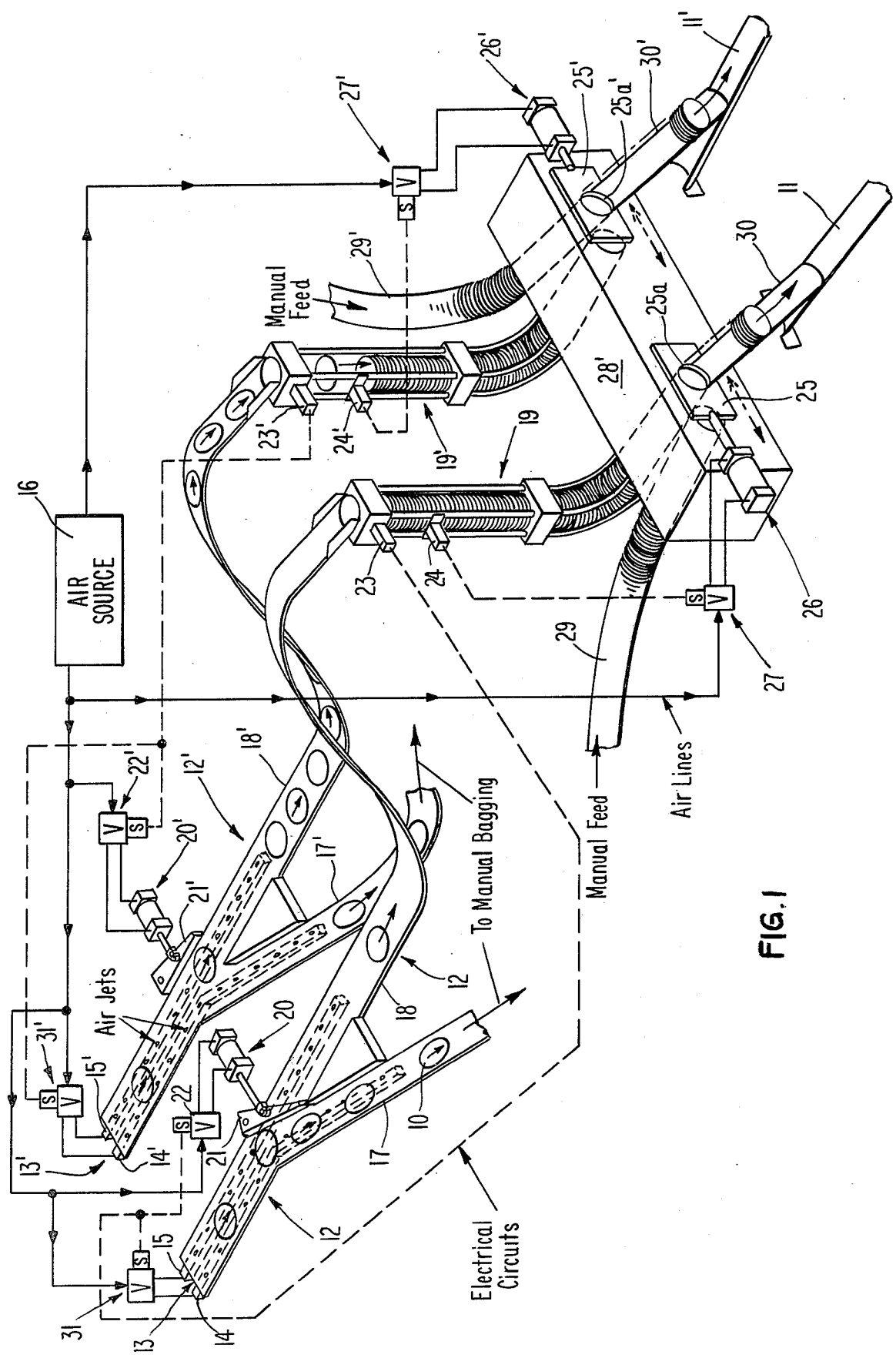
FIG. 1 is a partially schematic perspective view of the preferred embodiment of the present invention.

The automatic end handling device of the present invention is designed to transfer can ends or other such work pieces from a first press to a second press Thus in FIG. 1, can ends 10 are received from a first press, left of the drawing, (not shown) and discharged onto conveyors 11, 11' leading to a second press, right of the drawing (not shown).

As illustrated, two conveyors may be used in tandem for beneficial results and, in the description like numbers are assigned to like parts.

Can ends or work pieces are received by conveyors 12, 12' at the conveyor input ends 13, 13'. Air jet means 14, 14' and 15, 15' are provided beneath the conveyor. The air jet means include air jet holes which are suitably arranged to direct air from a source 16, such as a blower or compressor upwardly through the conveyor tracks 12, 12'. The air flow assists the movement and direction of the workpieces along conveyors 12, 12'. Switch-/valve assemblies 31, 31' under the control of limit switches 23, 23' control air from the source 16 to jets 14, 14' and 15, 15'. More particularly, the jets 14, 14' are energized when ends 10 are diverted to tracks 17, 17' and, alternatively, jets 15, 15' are energized when the ends 10 are conveyed along tracks 18, 18'.

Downstream from the entrance 13, 13' the tracks 12, 12' form a Y, with legs 17, 17' designed to feed can ends to a manual bagging operation or collection station (not shown) and the other legs 18, 18' operable to feed the ends 10 into stacking means 19, 19'.

At the Y junction of tracks 12, 12', there are air motors 20, 20' which actuate diversion means 21, 21'. When the air motors are in the withdrawn position, as shown in the case of air motor 20' for the righthand track in the drawing, the means 21' is in a "normal" position whereby the can ends 10 are carried by air from jets 15' along track 18' and thence into the stacking means 19'.

Alternatively, as shown in connection with the lefthand track depicted in the drawing, when air motor 20 is actuated it advances means 21 to divert the can ends 10 onto track 17 for the manual bagging means.

The aforementioned operation of the air motors 20, 20' is coordinated with switch/valves 31, 31' to operate air jets 14, 14' and 15, 15' as previously described.

The air motors 20, 20' are controlled via pneumatic valves and solenoids 22, 22' which, in turn, are controlled by high limit switches 23, 23' on stack means 19, 19'.

Thus, when the can ends 10 accumulate higher than high limit switch 23, as depicted in connection with the left-hand stack 19, the switch 23, through appropriate electrical circuitry energizes the solenoid 22 and operates air motor 20. The latter, in turn, moves the diversion means 21 to divert can ends 10 onto track 17 and thence to the manual bagging station. At the same time, switch 23 actuates switch/valve 31 to energize air jets 14 under track 17.

When the supply of can ends 10 falls below low limit switch 24', the later operates a gate 25' via an air motor 26' controlled by a switch/valve assembly 27'. The gate 25' has an opening 25a' which is moved into regirstry with a port in block 28 which connects with a track 29' fed by manual means. In this mode, ends 10 are fed manually onto track 29', through the block 28, through opening 25a' of gate 25' and onto a chute 30' which deposits the ends 10 onto track 11 which feed the second press or other working means.

When there is an adequate supply of ends 10 in the stacking means, as shown in connection with the left-hand stacking means 19, the gate 25 is shifted to a "normal" or automatic position whereby the openiing 25a therein registers with the conduit in block 28 which receives ends from stack 9. This occurs for as long as the supply of ends is higher than the lower limit switch 24.

When ends are diverted onto track 17 the end level in stack 19 will begin to fall since opening 25a is maintained in registry with conduit 32 which is joined to feed stack 19. When the end level falls below upper limit switch 23, diversion means 21 will retreat from its advanced position thereby again opening the path to track 18 leading to end stack 19. At the same time the air stream will be directed through jets 15 rather than through 14 and the can ends will be fed to the stack. If the end level in the stack continues to fall, as, for example, in the case of a malfunctioning first press, the gate will automatically shift once to align the opening with the manual feed channel when the end level falls below low level limit switch 24, 24'. The right hand stack 19' of FIG. 1 depicts such a condition. When the accumulation of ends in the stack exceed the level of the lower limit switch the gate will automatically return to the stack feed mode. When the accumulation of ends within the stack again exceeds the high level limit switch 23, 23', the diversion means will once again be shifted to direct additional ends to the manual bagging operation. Thus the upper limit switch controls the air flow and the diversion means while the lower limit switch controls the movement of the gate.

Figure 2:
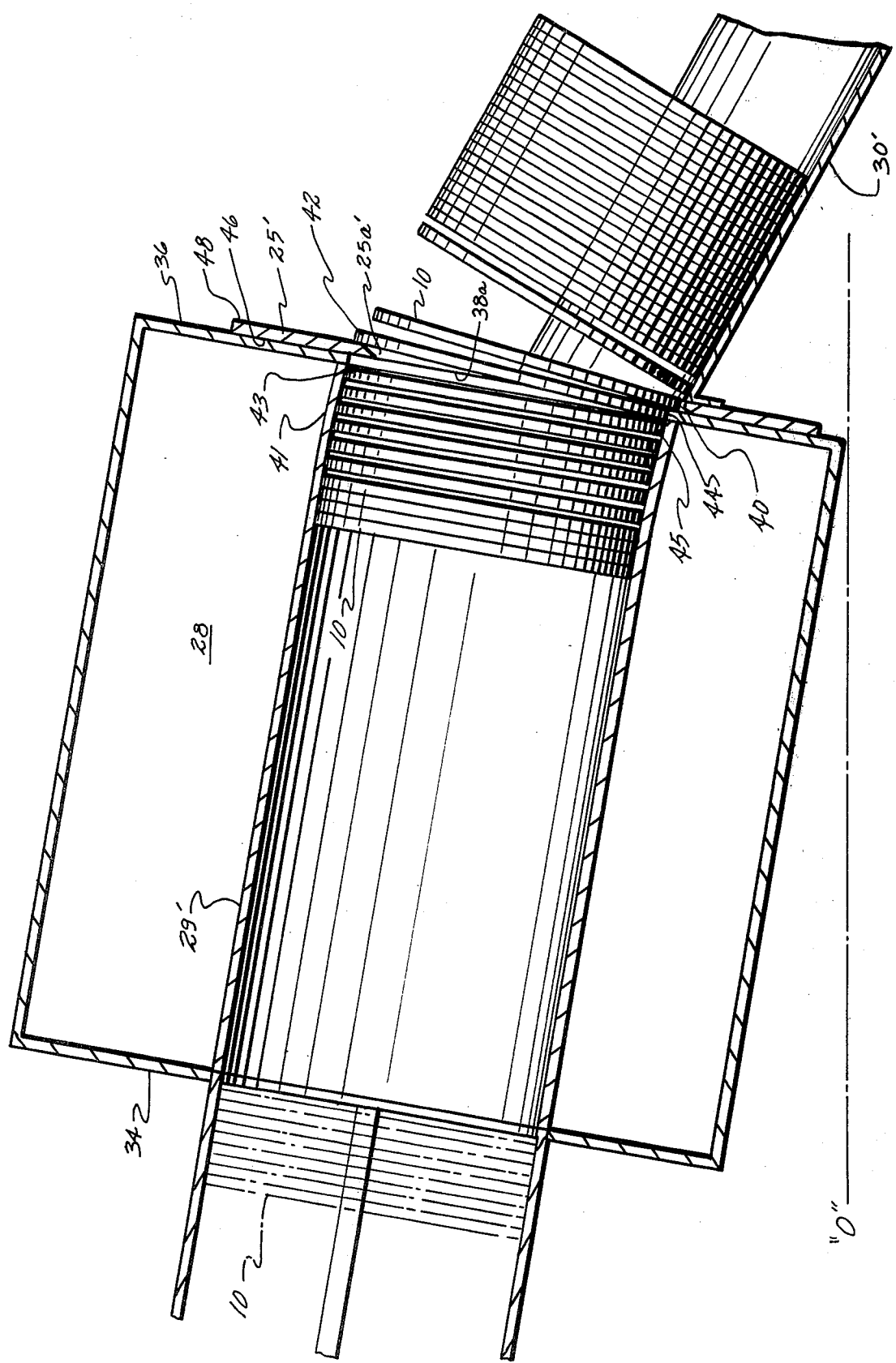
FIG. 2 is a sectional view of junction block 28 taken along line 2—2 of FIG. 1.
Figure 3:
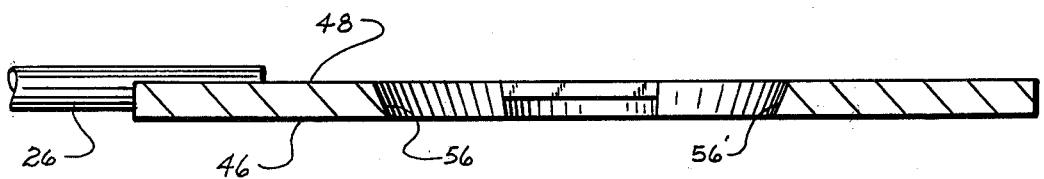
FIG. 3 is a sectional view of gate 25' taken along line 3—3 of FIG. 4.
Figure 4:
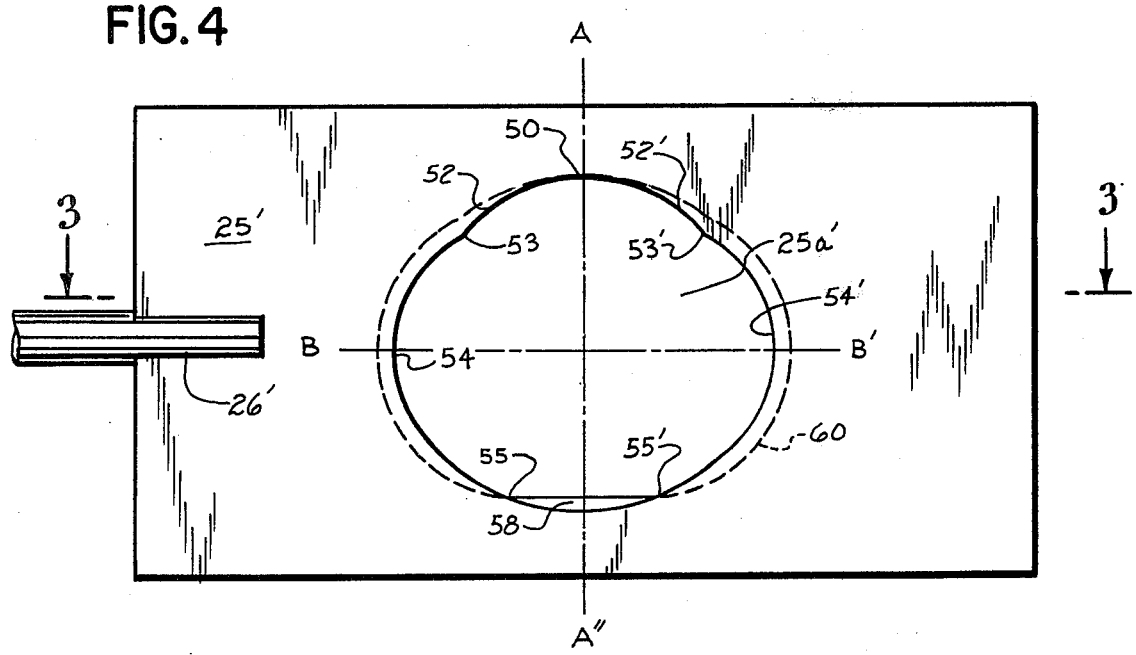
FIG. 4 is a rear view of gate 25' showing the abutting face.

Turning now to FIG. 2, herein, is a sectional view showing channel 29' received in junction block 28. The other input channels 29, 32 and 32' are similarly disposed within the block. The junction block has an inlet face 34 and an outlet face 36. The channel passes through the block in the form of a cylindrical conduit. The channel terminates at the outlet face in a circular port 38a', slightly larger in diameter than the diameter of the ends in process. Proximate termination of the channel, the direction is abruptly altered causing a sharp break at its lower periphery extremity 40. In this way, ends passing through the channel axially in stacked head to tail array are fanned as the pass through the exit port 38a'. The fanning causes the upper segments 42, 43 of the rims of the ends to be widely separated defining a gap therebetween while the lower segments of the rims 44, 45 are close together. Gate 25' is shifted in response to a signal received from sensor 24'. Gate 25' has an abutting face 46 in sliding contact with the outlet face 36 of block 28 and a free face 48 remote from outlet face 36. An opening 25a' in the abutting face 46 is designed to admit the passage of can ends 10 when in alignment with exit ports. As shown in FIG. 4., the opening forms a knife 50 of an irregular shape symmetrical about a minor axis, A, A' but asymmetrical about major axis B, B'. An arcuate section extending from cusp 53 clockwise to cusp 53' with a center of curvature lying on the minor axis A, A' and above major axis B, B' defines leading knife edges 52, 52'. The arcuate section extending clockwise from intersection point 55 to cusp 53 defines trailing edge 54 while the arcuate section extending clockwise from cusp 53' to intersection point 55' defines trailing edge 54'. Leading knife edges 52, 52' are substantially concentric with the upper segments of the rims of can ends received within the opening. The trailing knife edges 54, 54' are eccentric to the rims of a can end received within the opening. A leading surface 58 is provided at the base of the opening to assist in guiding ends through the gate. As shown in FIG. 3, the edges of the opening are beveled at an angle of about 30°, thereby gradually enlarging the opening to provide clearance or relief in the knife edge to facilitate the interruption of the advance of the work pieces.

In some instances it may be advantageous to replace the sharply defined cusps 53, 53' with inflexion points so that curves 52, 52' are merged with curves 54, 54'.

In a gating operation, the knife cooperates with the abruptly altered channel. As the ends are fanned apart in passing around break 40, in the channel 29', the spacing between widely separated rim segments 42, 43 affords a means for entry of leading edge 52', as seen in FIG. 2. The initial intrusion by leading edge 52' is followed by the intrusion of trailing edge 54' as gate 25' moves to cut off flow from manual feed channel 29' and to subsequently admit can end flow from stack 19' through channel 32' by aligning gate 25' with exit port 38'. Knife edges 52, and 54 are employed to cut off can end flow from feed stack 19'. Gate 25 is structured similar to gate 25'.

By utilizing a knife with a leading edge which intrudes into the path traversed by the can ends at a point where the ends are widely spaced, it is possible to repeatedly intercept the can ends and cut off flow without incurring disruption due to entrapment or jamming of the end between the knife blade and the outlet face of the junction block.

By use of the present invention, therefore, it is possible to automatically convey can ends from a first press to a second press as long as the output of ends from the first press equals or exceeds the demands of the second press. When the output of the first press exceeds the demand of the second press, the diverters 21, 21' are actuated by the high limit switches 23, 23' to direct ends to the manual bagging station, and this diversion continues until the supply of ends in stacks 19, 19' falls below high limit switches 23, 23'. When the latter event occurs, high limit switches 23, 23' actuate the air motors 20, 20' which, in turn, retract the diverters 21, 21' so that the ends 10 once again flow along tracks 18, 18' to the stacking means 19, 19'.

Alternatively, when the supply of can ends 10 from the first press in temporarily cut off, e.g., when the first press is not operating, or when the supply from the first press is less than the demand of the second press, the supply of ends 10 falls below switches 24, 24' and the latter energize the air motors 26, 26' which shift gates 25, 25' so that the openings therein register with the conduits in block 28 for the manually fed tracks 29, 29'. The operator will then load ends accumulated at the bagging station onto the tracks 29, 29' and will continue to manually feed ends until the first press resumes its supply of ends, i.e., until the supply of ends 10 in stacks 19 rise above low limit switches 24.

While this structure has been disclosed in relationship to a pair of cooperating presses such as a basic end press and a conversion press with an ancillary bagging station it should be recognized that is is equally applicable in any process where disc like wafers are being processed in two sequential operations with an intervening alternative holding station.

Similarly the conduit-knife relationship is not intended to be limited to a case where the channels or conduits are disposed side by side with the gate moving back and forth in a horizontal plane. The conduits might instead be disposed one over the other with the conduits undergoing a sharp horizontal rather than vertical change in direction. In such a case, the gate would move up and down and the leading knife edges would be disposed on one side of a major vertical axis rather than above a major horizontal axis. Other variations will be apparent to one skilled in the art. Thus it can be seen that the instant structure affords a simple but effective means for automatically feeding can ends from a first operation to a second operation in a manner which ensures operational continuity despite fluctuations in process supply and demand.

What is claimed is:

1. Apparatus for transferring a work piece from a first station to a second station comprising:
   (a) a main conveyor for said work pieces having an input end operably associated with said first station and an output end;
   (b) a stacking means for stacking said work pieces, said stacking means having a loading end and a discharge end, and wherein said loading end is operably associated with said output end of said main conveyor;
   (c) high and low indicator means associated with said stacking means for sensing the level of said stacked work pieces;

(d) a collection station for said work pieces, said collection station being intermediate said input end and said output end of said main conveyor;

(e) an auxilary conveyor for said work pieces connected to said main conveyor between said input end and said output end thereof, said auxiliary conveyor terminating at said collection station;

(f) a manual feed conveyor, extending from said collection station to an exit proximate said stacking means discharge end, said manual conveyor being disposed to receive and convey work pieces manually fed thereto;

(g) a gate having an opening therein and movable from a first position wherein said opening is aligned with said discharge end of said stacking means to a second position wherein said opening is aligned with said manual conveyor exit;

(h) second station conveying means extending from said gate to said second station;

(i) diverter means associated with said main conveyor and said auxiliary conveyor and responsive to a signal from said high indicator means to divert the flow of work pieces from said main conveyor to said auxiliary conveyor when said level of work pieces in above said high indicator means and to permit the flow of work pieces to procede along said main conveyor when said level is below said high indicator means; and (j) moving means operably connected to said gate, to move said gate in response to a signal from said low indicator means from said first position to said second position when said level falls below said low indicator means and from said second position to said first position when said level rises above said indicator means.

2. The invention of claim 1 wherein said work pieces are can ends.

3. The invention of claim 1 wherein said first and second stations are presses for manufacture of can ends.

4. The invention of claim 1 further including means for supplying air to jets located in said main and said auxiliary conveyors to direct the movement of work pieces and means responsive to said high indicator means to switch the air supply on and off.

5. In an automatic can end transfer device having a main can end conveyor for transporting can ends to a stacking means and a manually fed second conveyor, wherein said stacking means and said second conveyor terminate adjacent to each other, the combination comprising:

(a) a gate adjacent the terminal ends of said stacking means and said second conveyor, said gate having an opening therein; said gate being movable from a first position wherein said opening is aligned with stacking means to a second position wherein said opening is aligned with said second conveyor; and (b) means for moving said gate from said first to said second position in response to the number of can ends in said stacking means.

6. Gating means for directing the flow of can ends to a common outlet conveyor from multiple input channels comprising:

(a) a junction block with an inlet side and an outlet side and wherein a first input channel and a second input channel enter said block through said inlet side and terminate as a first port and a second port in said outlet side and wherein said channels direction is abruptly altered proximate said termination whereby can ends passing through said channels in stacked array are fanned apart so that first segments of their rims are widely separated, while second segments, diametrically opposite said first segments, are in close contact as said ends exit through said port;

(b) a gate, slidably mounted on said outlet side, said gate having an abutting face in contact with said outlet side, and a free face remote therefrom, said gate having an opening therein through which said can ends may pass, said opening being aligned with said ports, said opening defining a knife in said abutting face with a leading edge and a trailing edge;

(c) means for moving said gate from a first position wherein said gate is aligned with said first port to a second position wherein said gate is aligned with said second port or from said second port to said first port and wherein said leading edge of said knife enters the path of said ends between said first rim segments where said rims are widely separated and said trailing edge of said knife subsequently enters the path of said ends where said rims are more closely spaced and whereby said flow of can ends may be interrupted from one channel and initiated from a second channel quickly and without entrapping or jamming an end between said gate and said junction block; and (d) chute means for conveying said ends from said gate to said outlet conveyor.

7. A gating means as recited in claim 6 wherein said opening in said gate is gradually enlarged in passing from said abutting face to said free face thereby providing relief from said knife edges.

8. A gating means as recited in claim 6 wherein said knife edge operable against said second rim segments is beveled to provide a lead in surface in said face.

9. A method of interrupting the axial advance of disc-like work pieces in stacked array under conveyance within a conduit having curved sections and straight sections, said conduit having an internal diameter slightly larger than the outside diameter of said workpieces to provide sliding clearance, comprising the steps of:

(a) selecting a curved section of said conduit in which by virtue of said curved section a first peripheral segment of each work piece is spaced from a corresponding peripheral segment of the next adjacent work piece to define a gap therebetween while corresponding second peripheral segments of said work pieces are close together, said work pieces being fanned;

(b) forming an opening in said conduit in the region of said fanning; and (c) interrupting the advance of said work pieces by interposing a knife between adjacent work pieces at said gap and subsequently moving said knife across the path traversed by said work pieces within said conduit to stop the advance of work pieces without entrapping or jamming a workpiece between said knife and said conduit.

* * * * *